(12) United States Patent (10) Patent No.: US 9,796,102 B2
Bro (45) Date of Patent: Oct. 24, 2017

(54) KNIFE ARRANGEMENT

(75) Inventor: Thomas Bro, Storvorde (DK)

(73) Assignee: Marel Salmon A/S, Stovring (DK)

( * ) Notice: Subject to any disclaimer, the term of this patent is extended or adjusted under 35 U.S.C. 154(b) by 221 days.

(21) Appl. No.: 13/147,851

(22) PCT Filed: Feb. 3, 2010

(86) PCT No.: PCT/DK2010/050033
§ 371 (c)(1),
(2), (4) Date: Oct. 17, 2011

(87) PCT Pub. No.: WO2010/088915
PCT Pub. Date: Aug. 12, 2010

(65) Prior Publication Data
US 2012/0017449 A1    Jan. 26, 2012

(30) Foreign Application Priority Data
Feb. 4, 2009    (DK) .................... 2009 00166

(51) Int. Cl.
*B26D 1/00*        (2006.01)
*B26D 1/11*        (2006.01)
*A22C 17/00*       (2006.01)
*B26D 3/28*        (2006.01)
*B26D 5/00*        (2006.01)
(Continued)

(52) U.S. Cl.
CPC ............ *B26D 1/11* (2013.01); *A22C 17/0033* (2013.01); *B26D 3/28* (2013.01); *B26D 5/007* (2013.01); *B26D 5/06* (2013.01); *B26D 5/32* (2013.01); *B26D 7/0625* (2013.01);
(Continued)

(58) Field of Classification Search
CPC .......... B26D 1/00; B26D 1/0006; B26D 1/03; B26D 1/06; B26D 1/065; B26D 1/10; B26D 1/1105; B26D 1/11; B26D 1/115; B26D 1/45; B26D 1/445; B26D 1/50; B26D 1/505; B26D 1/52; B26D 1/525; B26D 1/54; B26D 1/543; B26D 7/26; B26D 7/2614; B26D 7/0625; B26D 7/2628; B26D 3/28; B26D 5/007; B26D 5/06;
(Continued)

(56) References Cited

U.S. PATENT DOCUMENTS 4,280,276 A * 7/1981 Comer .................. A01G 3/053
30/144
4,386,609 A * 6/1983 Mongeon ...................... 606/53
(Continued)

FOREIGN PATENT DOCUMENTS

EP      0445403     9/1991
FR      2666534     3/1992
(Continued)

*Primary Examiner* — Phong Nguyen
(74) *Attorney, Agent, or Firm* — James Creighton Wray; Meera P. Narasimhan

(57) ABSTRACT

Knife arrangement for use in for example a slicer apparatus for slicing meat, and in particular fish meat, wherein the knife arrangement comprises two reciprocating knives 40, 40', each knife 40, 40' has a blade 54 with a sharp edge 55 and an opposite edge 56, and blade material between said edges, where adjacent a first end 57 of each knife 40, 40' an engagement member 58 is arranged, which engagement member 58 protrudes perpendicular to the plane of the blade 40, 40'.

9 Claims, 8 Drawing Sheets

(51) Int. Cl.
*B26D 5/06* (2006.01)
*B26D 7/06* (2006.01)
*B26D 7/26* (2006.01)
*B26D 5/32* (2006.01)

(52) U.S. Cl.
CPC ......... *B26D 7/2614* (2013.01); *B26D 7/2628* (2013.01); *B26D 2210/06* (2013.01); *Y10S 83/932* (2013.01)

(58) Field of Classification Search
CPC ...... B26D 5/32; B26D 2210/06; B27B 21/00; B27B 21/02; B27B 3/22; Y10S 83/932
USPC .......... 30/299, 506–508, 304, 517, 522–525; 83/932
See application file for complete search history.

(56) References Cited

U.S. PATENT DOCUMENTS

| | | |
|---|---|---|
| 5,022,299 A | 6/1991 | Fischer |
| 2006/0016315 A1* | 1/2006 | Zorich ................ B23D 61/025 83/835 |

FOREIGN PATENT DOCUMENTS

| | | |
|---|---|---|
| JP | 06039784 | 2/1994 |
| WO | 00/05968 | 2/2000 |

* cited by examiner

KNIFE ARRANGEMENT

This application claims the benefit of Danish Application No. PA 2009 00166 filed Feb. 4, 2009 and PCT/DK2010/050033 filed Feb. 3, 2010, which are hereby incorporated by reference in their entirety as if fully set forth herein.

FIELD OF THE INVENTION

The present invention relates to a set of knives for use in a slicer apparatus.

BACKGROUND OF THE INVENTION

In the art a number of various slicing devices of the type mentioned above are well-known. Among the manufacturers of such slicing apparatuses are CP Food Machinery, GEBA Maschinentechnik and others. Common for all these prior art apparatuses is the fact that the fillet to be treated is placed on a conveyor which will transport the fish fillet past a cutting arrangement where the fish fillet is sliced according to predetermined parameters. As the fillet passes the cutting arrangement, the slices will more or less be maintained in the shape of the original fish fillet and eventually be transferred to a board typically a piece of cardboard covered with a silver or gold look-alike finish. After this, the sliced fillet is vacuum-packed and sold for consumption.

Although a wide variety of meat products may be used with the slicing apparatus as described above they find widespread use when slicing fish fillets and in particular salmon and halibut fillets which may have been pre-treated before the slicing process.

In order to be able to slice the fish products quickly enough, a set of reciprocating knives is used which reciprocating knives are forced through the meat of the fillet towards a cutting land. The cutting land is typically a plastic construction in which a groove is formed such that as the knife passes through the fish meat, it will be able to penetrate slightly into the cutting land due to the provision of a groove. When the angle between the knife's cutting plane and the land is initially adjusted a zero-point is created. This zero-point is the optimal position/angle of the knives relative to the cutting land where the knives of the cutter are at the closest with the cutting land such that a clear, clean and finished cut may be achieved during production. However, during the process of cutting fillets it is desirable to be able to change the cutting angle. As the cutting angle is changed, the relationship between the cutting land and the knives also changes whereby the zero-point is no longer achievable, whereby a lesser cutting result is achieved.

In order to optimize the output of the single fillet it is desirable to be able to change the cutting angle during cutting of each single fillet, and it has therefore been tradition to adjust the zero-point such that the major part of the slices, typically the slices in a middle region of the fish fillet, have optimum cutting conditions.

An important part of the process of cutting fish is that the knives are sharp, provided with the correct edge characteristics depending on the consistency of the fish meat and are maintained at a high degree of cleanliness for hygienic reasons.

Stopping the machine and replacing the knives may be a relatively cumbersome process which takes a relatively long time in that the prior art knives in one end are provided with a welded-on nut such that engagement means on the arms connected to the reciprocating motor means which will make the knives move in a reciprocating manner relative to each other are likewise provided with an aperture. By superposing the aperture on the nut welded to the knife and inserting a bolt through the aperture connecting the thread inside the nut welded to the knives, it is possible to fasten the knives to the reciprocating arm. As the reciprocating mechanism is traditionally maintained inside the machine, it is often also necessary to lift or remove a cover in order to gain access to the bolts that need to be unscrewed in order to release the knives when replacing the knives.

OBJECT OF THE INVENTION

It is therefore an object of the present invention to increase the cutting quality, improve the hygienic conditions around the machine and provide increased output without deteriorating the quality of the product.

DESCRIPTION OF THE INVENTION

This is achieved with a knife arrangement for use in for example a slicer apparatus for slicing meat, and in particular fish meat, wherein the knife arrangement comprises two reciprocating knives, each knife has a blade with a sharp edge and an opposite edge, and blade material between said edges, where adjacent a first end of each knife an engagement member is arranged, which engagement member protrudes perpendicular to the plane of the blade.

It is known in the art to use reciprocating knives for slicing apparatuses of this type. One known problem here, however, is the fact that as production increases, they wear out rather quickly. Especially when used to cut hard items or semi-hard items such as for example partly frozen or entirely frozen fillets the tear and wear on the knives is relatively high.

Furthermore, the knives need to be in a condition where they are very sharp, especially when cutting the tail sections of for example salmon or the skin in cases where the fish skin is left on the fillets very sharp knives are required. This is due to the fact that the tail section of a fish fillet usually comprises tendons and nerves which makes it relatively more difficult to cut these sections than for example the middle section where most of the tendons and nerves have been removed during the de-boning and filleting process. Also for hygienic reasons it is very important to be able to remove the knives very quickly such that a thorough cleaning of the apparatus may be achieved.

With the inventive method of mounting the knives in the reciprocating holder by means of inserting an engagement member into a pre-shaped hole and loosely holding the opposite end of the knife, but guiding this end very accurately, it is possible to replace the knives very quickly such that production stops can be kept at a minimum.

In a further advantageous embodiment the blades of the two knives are arranged adjacent each other, with their sharp edges oriented in the same direction, and the engagement member on either blade protrudes in opposite directions relative to the blade's plane, but substantially parallel to a common axis.

By this arrangement it is ensured that when the knives are mounted in a mechanism creating the reciprocating movement of the knives the blades of the two knives will be moved in substantially the same plane such that the edge of the knives will be working at exactly the same cutting line such that relatively thin slices may be acquired. A slight deviation of the plane of the knives relative to each other will cause material from the meat to be cut to be stuck in-between the two blades which will cause a very uneven cutting action which may cause the meat to be torn apart and thereby be rendered useless. It is therefore very important that the blades of the knives are arranged substantially in the same plane and that their engagement members protrude in opposite directions but parallel to a common axis.

In a still further advantageous embodiment the blades in a second end opposite the first end in a knife guiding zone are provided with a flat unsharpened blade profile.

As the set of knives only needs to be fastened in one end the replacement of used knives by new knives is further simplified and thereby the time needed to replace the knives is minimized. Tests with the set of knives according to the present invention have demonstrated, that by using guiding zones at a distal end of the blades which distal ends are inserted into a guiding member mounted on the apparatus, is a very reliable manner in which to mount the knives. Furthermore the wear in the guiding member due to the reciprocating movement of the two blades is negligible such that a very long life expectancy is expected. Furthermore, in the apparatus the guiding zone was provided with a replaceable plastic member such that as wear eventually occurred, it was very quick and easy to replace the plastic member in the guiding zone.

In a still further advantageous embodiment one or both knives on the blade material between the two edges on the side of the blade from which the engagement member protrudes, is provided with a plurality of cavities, said cavities being oblong and arranged with their longest axis perpendicular to the edges of the knife blade. In order to maintain a relatively high rate of production the action of the knives is very rapid, and as such it is important that the knives are allowed to work through the meat as easily as possible. By providing the cavities, which are relatively shallow, the cohesion between the meat and the knives is broken such that the knives will be able to move relatively freely through the meat without disturbing the texture of the meat. Rapid, clean and very exact cuts may be achieved with the inventive knives. The size and orientation and depth (shallowness) of the cavities may vary according to the type of meat which is being cut, and it has been found that the texture of the meat, the moisture content, the oil content and the temperature are all important factors in determining which pattern of cavities and the shape of these cavities are most advantageous in use.

In a still further advantageous embodiment of the invention the sharp edge is provided with a wave or zigzag shape.

Again, depending on the type of meat, the temperature, the oil content, the texture etc., various sharp edge designs appear to be more advantageous used with certain types of meat than others.

The inventive set of knives are particularly useful in a method for slicing fish fillets in a slicer apparatus as described above where said apparatus comprises a conveying path and cutting means arranged in said conveying path, where the cutting means comprises a set of moveable reciprocating knives and a cutting land, where the cutting means further comprises means for moving the knives relative to the cutting land and the surface of the conveyor path and where the cutting means are arranged on a common member which member may be rotated through a predetermined arch about a horizontal axis, perpendicular to the conveyor path's transport direction where the fillet to be sliced is placed on said first conveyor and where the conveyor path is substantially linear and that the path comprises first, second and third separate conveyors arranged end to end for transporting the fillet through the apparatus, and where the cutting means are arranged between the second and third conveyor seen in the conveyor path's travelling direction, and where the means for detecting the thickness perpendicular to the conveyor's surface of a fish fillet transported on the first conveyor, provides input to the cutting means, where the input is relayed to a pre-programmed computer, where information relating to fillet size, fillet weight, slice thickness, fillet meat condition and conveyor speed is used by the computer to provide the cutting means with optimum parameters, according to the desired output, where the output relating to each fillet may be defined as a number of slices, area of each slice, weight of each slice and the like, and where the input is further used to control the travel of the knives relative to the cutting land such that the distance is kept as short as possible.

The method steps describes the utilization of the different features of an apparatus incorporating a set of knives as already discussed above, and it is clear that the utilization of an inventive and advantageous set of knives as described above also provides for a production method with all the advantages already listed above.

DESCRIPTION OF THE DRAWING

The invention will now be described with reference to the accompanying drawing wherein

In FIG. 1 is illustrated an apparatus in which the knives according to the invention are suitable to be mounted. The apparatus will briefly be explained, in order to illustrate the application of the inventive knives. It is in this connection important to notice that the use of the knives are not limited to apparatuses like the one described, but may be used with a wide variety of slicing apparatus using reciprocating knives.

Figure 1:
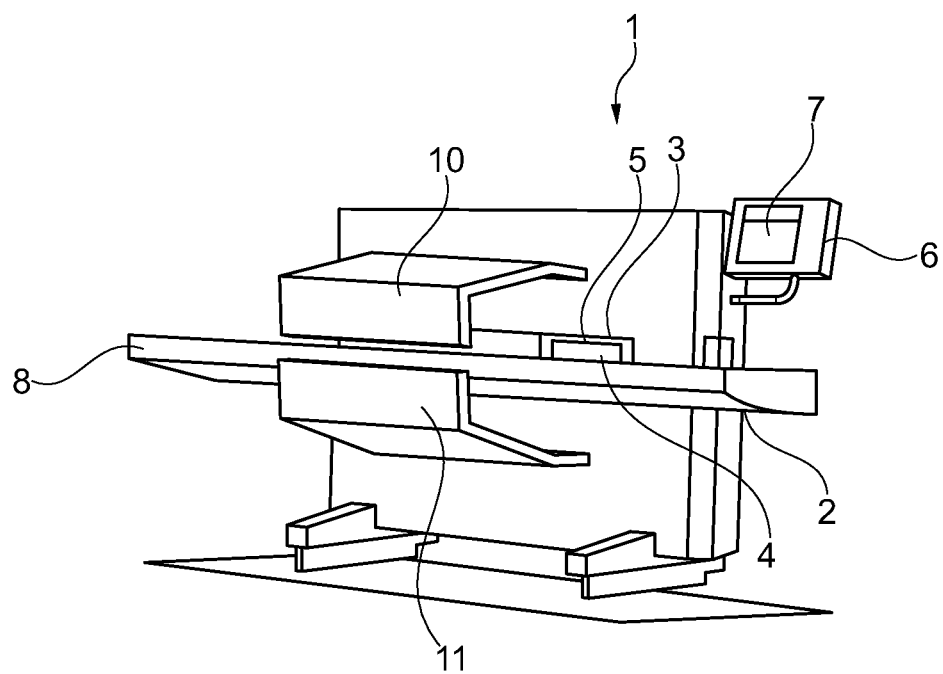
FIG. 1 illustrates an embodiment of the invention in a production ready mode.

The illustrated apparatus 1 is in a production ready mode in that the moving parts except for the conveyor belts are enclosed in protective covers 10, 11. The conveying path 2 is here illustrated to be continuous but is in fact, as will be described below, constituted by three separate conveyor belts. A mechanism 3 for detecting the thickness of the fish fillets arranged on the conveyor path 2 is arranged upstream from the cutting mechanisms hidden by the covers 10, 11. The height measuring mechanism 3 in this embodiment operates such that as a fish fillet is put on the conveyor path 2 it will engage the flap 4 which will make the axle 5 rotate which rotation is detected and converted to a height measurement.

The apparatus 1 is furthermore equipped with a control station 6 which in this embodiment comprises a touch screen 7.

After fillets are placed on the conveyor path 2 and have passed the height measuring device 3 and the cutting means hidden by the covers 10, 11 the sliced fillet will eventually be transferred to a packaging conveyor 8 arranged at the very downstream end of the conveying path 2.

Figure 2:
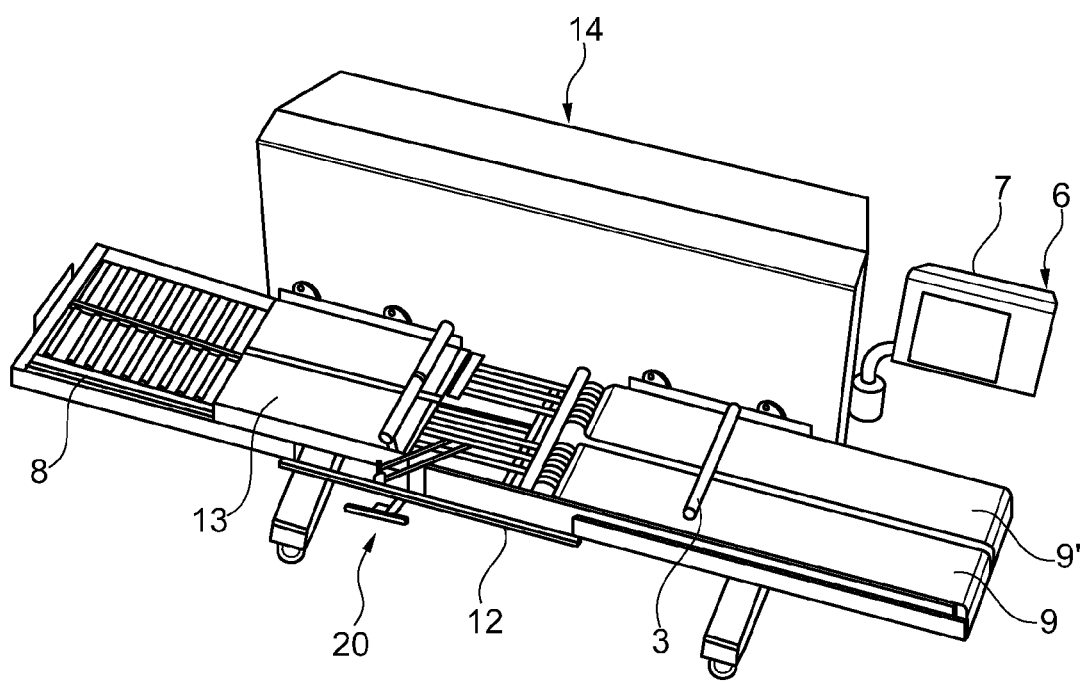
FIG. 2 illustrates the invention from an angle seen slightly from above and with the covers 10, 11 removed.

In FIG. 2 the apparatus 1 is illustrated from an angle seen slightly from above and with the covers 10, 11 removed. In this manner it is possible to detect the three conveyors where a first conveyor 9 arranged upstream from the cutting mechanism transport the fish fillets towards the thickness measuring device 3 and eventually the cutting means. The second conveyor 12 is in this embodiment illustrated without a conveyor belt, but will bridge the gap between the first and the third conveyor 13. The second conveyor 12 is special in that it comprises means, for example in the shape of spikes protruding from the surface of the conveyor belt which spikes will insert themselves into the fish meat such that a very firm and stable connection is established between the conveyor belt and the fish fillet. This is necessary in that the cutting means 20 will impact some force to the fish fillet whereby it is necessary to ensure a fixed hold on the fish fillet in order to produce the required quality. The mechanism for powering and operating the cutting means 20 is partly visible, but will be explained in detail below, and the part not visible is enclosed in the housing 14.

In this particular embodiment parallel sets of conveyors 9, 9' are arranged such that two fish fillets at one time may be sliced by the cutting means 20. The packaging station 8 comprises means underneath the third conveyor 13 for placing, for example a piece of cardboard in the transport direction of the third conveyor 13 such that the sliced fish fillet transported on the conveyor 13 will be delivered onto the cardboard 13 for further processing, for example vacuum packaging etc.

Figure 3:
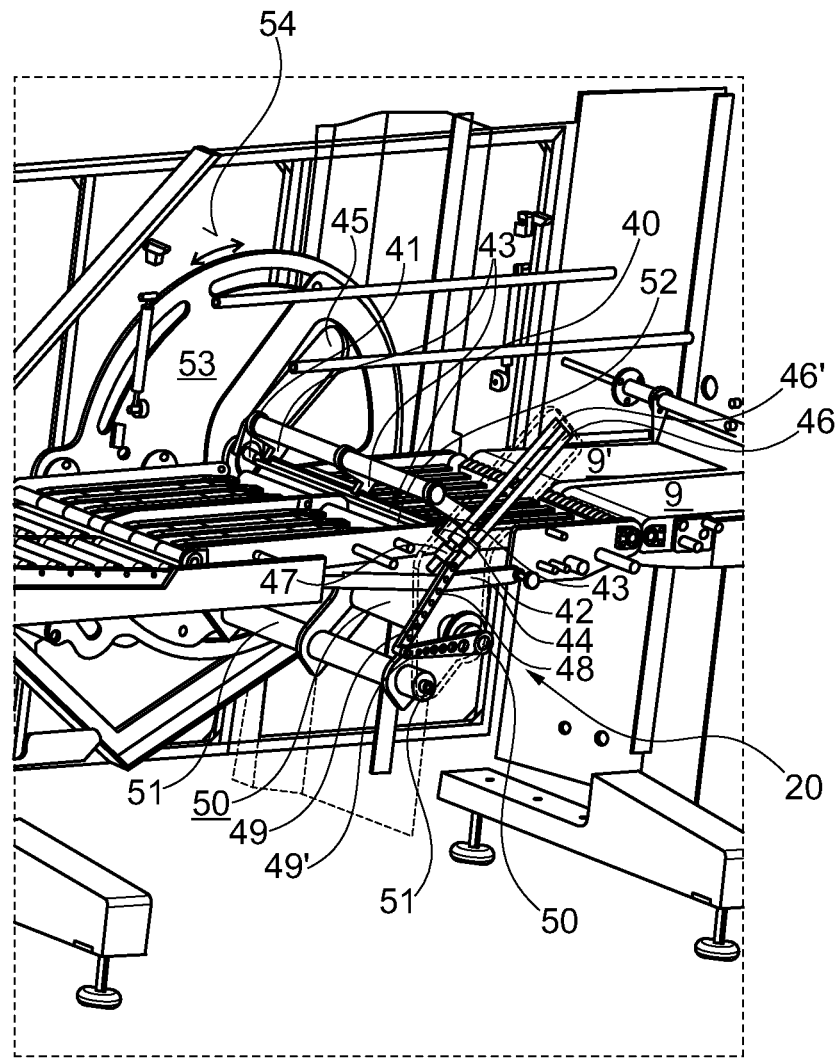
FIG. 3 illustrates a close-up of the cutting means.

In FIG. 3 a close-up of the cutting means is illustrated where certain elements have been hidden.

The cutting means 20 comprises a set of knives 40 which are releasably held in knife holders 41, 42 arranged in either end of the knives. In this example where two conveyor belts 9, 9' are arranged in parallel, the knives 40 therefore have relatively long cutting edges, a support structure 43 is provided in order to minimize deflection, bending etc. of the knives 40 during operation. As the impact (load) from engagement with the fish along the cutting edge may be estimated as evenly distributed the fact that the knives are fastened in both ends of the knives, reduces the load significantly. The load depends on the length squared, so by reducing the free length the load is reduced by the square root. The knife holders 41 are arranged in guiding means 44, 45 arranged in either end of the knives 40. The guiding means 44 in this embodiment comprises two axles 46, 46' as well as a sliding element 47 arranged such that it may slide up and down along the axle 46, 46'. A base plate 48 is arranged such that it may rotate about the axle 50. The rotation occurs when the axle 51 is moved in an arch as will be explained below. As the axle 51 is moved along an arch the axle 46, 46' will change their angle relative to the surface of the conveyors 9, 9'.

The sliding element 47 is coupled by means of the arms 49, 49' to the axle 50. As the axle 50 is brought to turn back and forth as will be explained below, the arms 49, 49' will cause the sliding member to move up and down along the guiding axles 46, 46' and in turn move the knives 40 to and from the cutting land 52.

In the opposite end of the knives the housing cover has been removed in order to illustrate the mechanism. The guiding means 45 are provided in a substantially circular plate member 53 which may be rotated back and forth as indicated by the arrow 54. The axles 50, 51 are fastened to this circular plate 53 such that as the circular plate member 53 is rotated as indicated by the arrow 54, the base plate 48 will also be rotated whereby the angle between the knives relative to the conveyor belt's surfaces will be altered.

Figure 4:
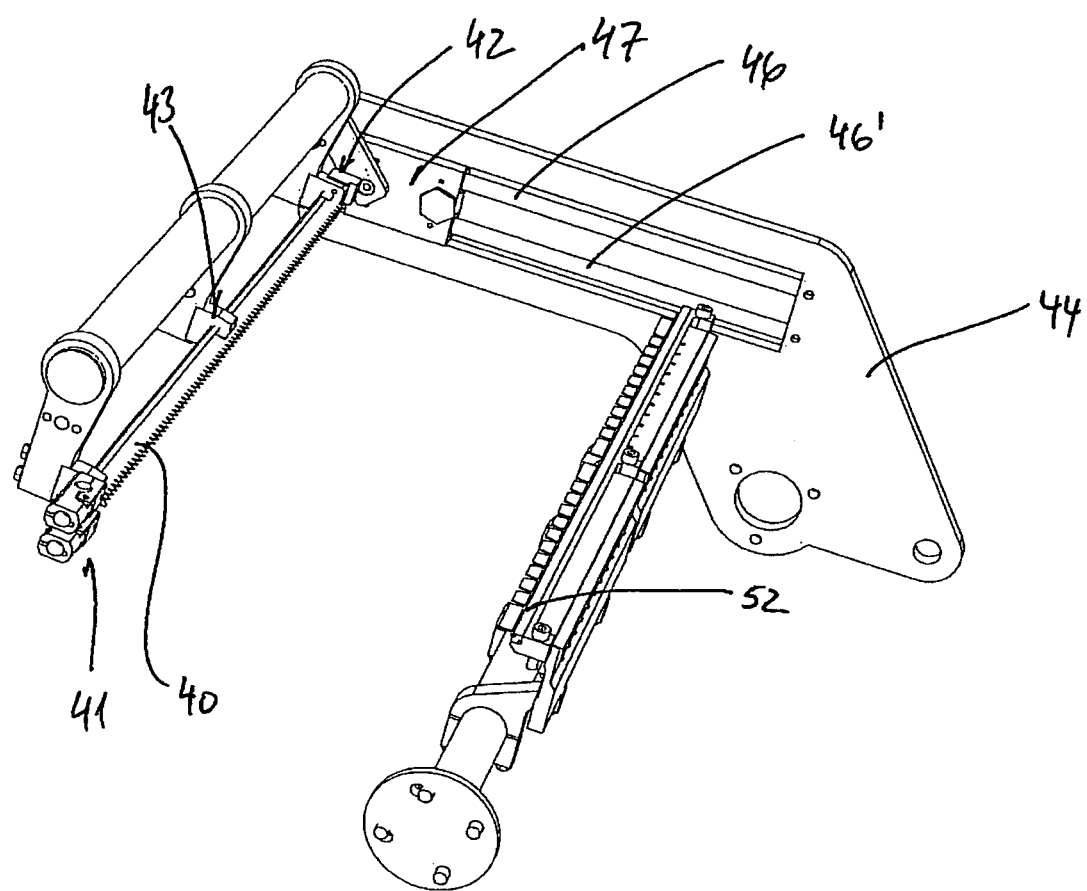
FIG. 4 illustrates a detailed view of the knives arranged in an apparatus as illustrated in FIGS. 1 to 3.

In FIG. 4 the vital parts relating to the knife arrangement are illustrated in more detail. The set of knives 40 is arranged in the knife holders 41, 42 and an intermediate support structure 43 is provided substantially halfway between the knife holders 41, 42 in order to stabilize the knives which, in this embodiment have a length corresponding to two conveyors 9, 12 arranged in parallel, see FIG. 1 or 2. The cutting land 52 is arranged on the member 44 such that by moving the knives 40 which are fastened to the sliding element 47 along the two axles 46, 46' the knives 40 may be brought to the right in FIG. 4 until it meets the cutting land, whereby any meat section placed between the knife and the cutting land will have been sliced.

Figure 5:
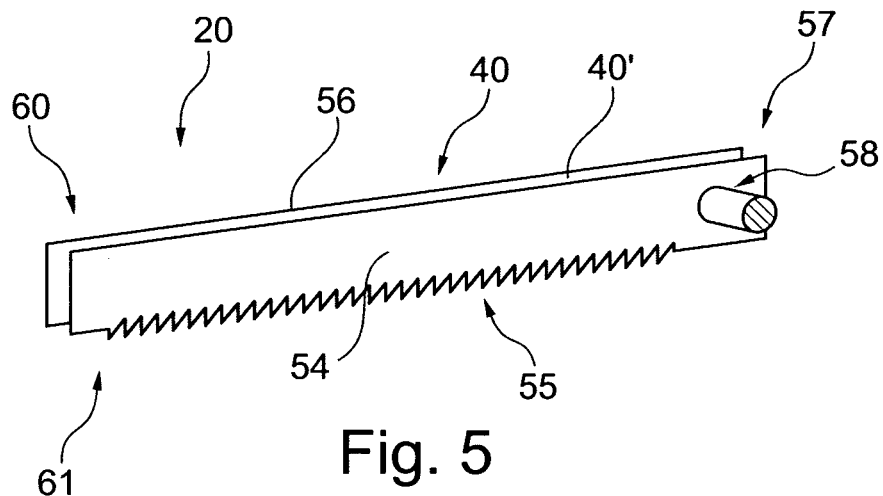
FIG. 5 illustrates in a perspective view a set of knives.
Figure 10:
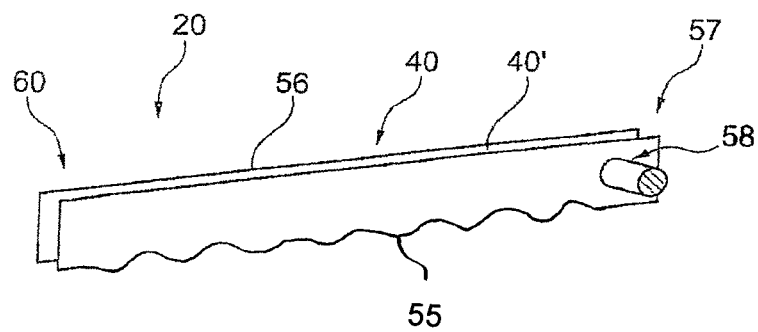
FIG. 10 illustrates a knife with a wave shape.

In FIG. 5 is schematically illustrated a set of knives 40, 40'. Each knife has a blade 54 which has a lower edge 55 which on a major length of said lower edge 55 is provided with a cutting edge, for example a wave (see, FIG. 10) or zigzag pattern. The opposite edge 56 may be dull or may also be provided with a sharpened knife cutting edge along a major section of the upper edge. Although it is only the lower edge 55 which will engage and cut the meat, by providing the upper edge 56 with a cutting edge as well, it is possible to turn the cutting arrangement 20 upside down such that what was formally the upper edge 56 now becomes the lower edge 55 such that the period between replacing the set of knives 40, 40' is substantially extended. This is in part facilitated by symmetric engagement members.

On the face of the blade 54 each knife 40, 40' is provided with an engagement member 58 in the shape of a cylindrical stud. The cylindrical stud is arranged in a first end 57 of the blade whereas the opposite second end 60 is provided with a section 61 where the blade's edges are dull. When arranged in an apparatus as described above this section 61 will be arranged in a knife guiding zone as will be further explained below with reference to FIG. 9.

Figure 6:
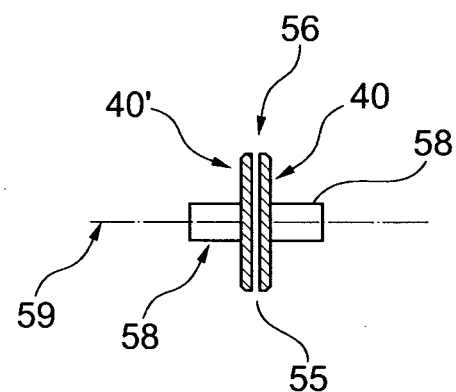
FIG. 6 illustrates details of a cross section through a set of knives.

In FIG. 6 is illustrated a vertical cross section through the two knives 40, 40' in order to illustrate that the engagement members 58 are arranged parallel to a common axis 59.

Figure 7:
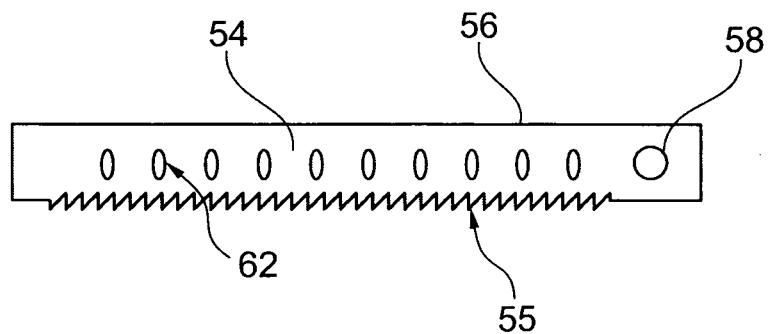
FIG. 7 illustrates a knife with cavities.

FIG. 7 illustrates a blade provided with cavities 62 arranged substantially equidistant on the blade 54. The cavities are preferably oblong with their long axis perpendicular to the edges 55, 56. In this configuration the cavities 62 having a relatively shallow depth will have the effect that the meat will not be adhering to the knife's blades such that a clean and fast cutting action may be achieved with the knives 40, 40' without disturbing the texture of the meat to be cut.

Figure 8:
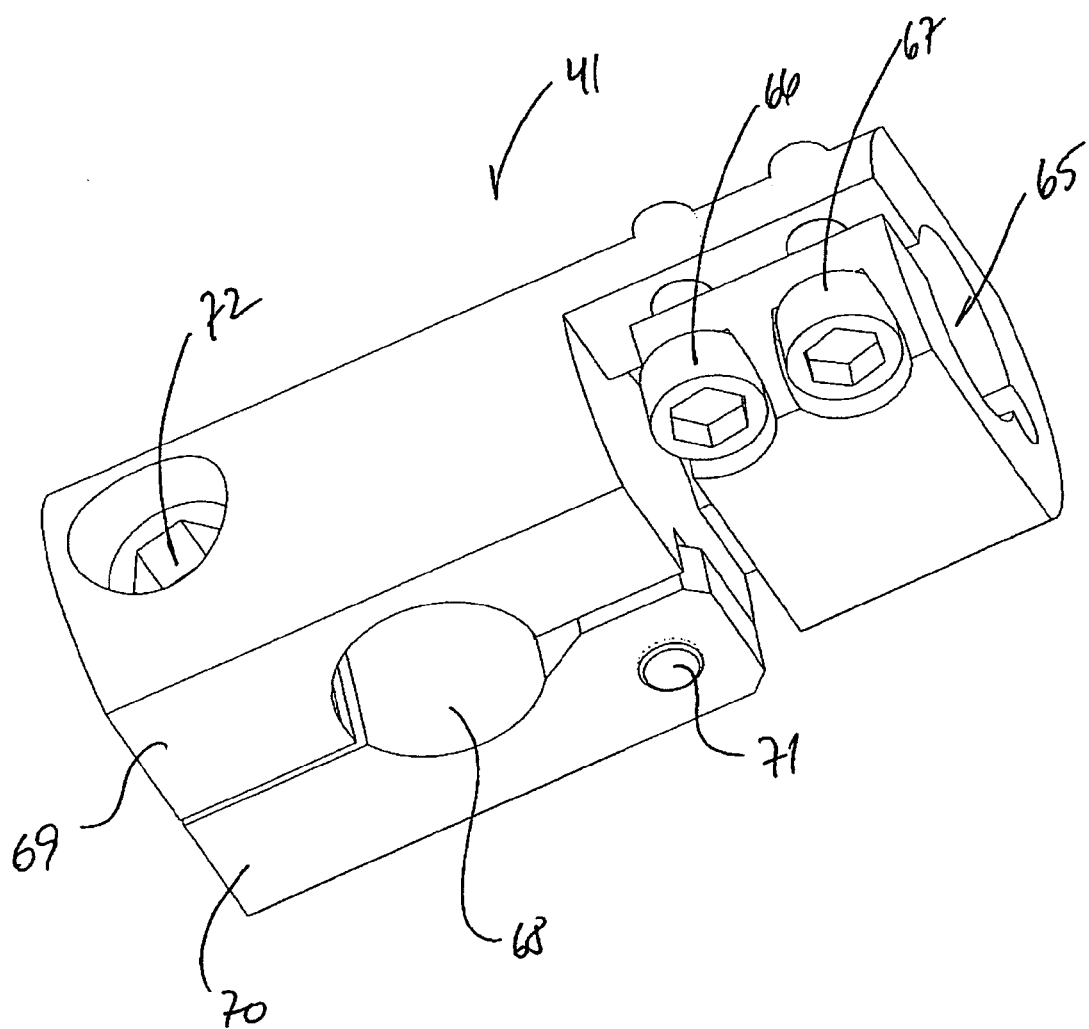
FIG. 8 illustrates the knife holder for the end of the knife with the engagement member.

One of the inventive features with the present invention is the easy replacement of the knives in the apparatus. This is partly due to the provision of the engagement member 58 and the knife holders 41, 42. In FIG. 8 is illustrated a knife holder 41. The knife holder 41 is to be fastened to a reciprocating member (not illustrated) of the cutting machine. This is carried out by inserting a distal end of the reciprocating member into the cavity 65 of the holder 41. By tightening the two screws 66, 67 the knife holder 41 is securely fastened to the reciprocating member. The cavity 65 shall be shaped corresponding to the distal end of the reciprocating member.

In the holder 41, is further provided a cavity 68 which has a dimension such that the engagement member 58 may be accommodated inside the cavity 68. The cavity 68 is provided by the two members 69, 70. A member 70 is pivotally connected by a hinge arrangement 71 to the member 69 such that by pivoting the member 70 around the pivot member 71 the cavity 68 may be enlarged whereby the engagement member 58 of the knives 40, 40' easily may be inserted into the cavity 68.

As the member 70 is pivoted back into the position illustrated in FIG. 8, the two members 69, 70 may be fastened by means of the screw 72 such that an engagement member 58 arranged inside the cavity 68 is securely and firmly held by the knife-holder 41.

When desiring to replace the knife 40 the screw 72 is simply loosened such that the distance between the members 69, 70 is widened whereby it is possible easily to withdraw the engagement member 58 from the aperture 68. A new knife having the same properties as the knives explained with reference to FIGS. 5-7 according to the present invention may easily be inserted into the cavity 68, the screw 72 may be tightened again and the apparatus is ready to proceed cutting meat.

Figure 9:
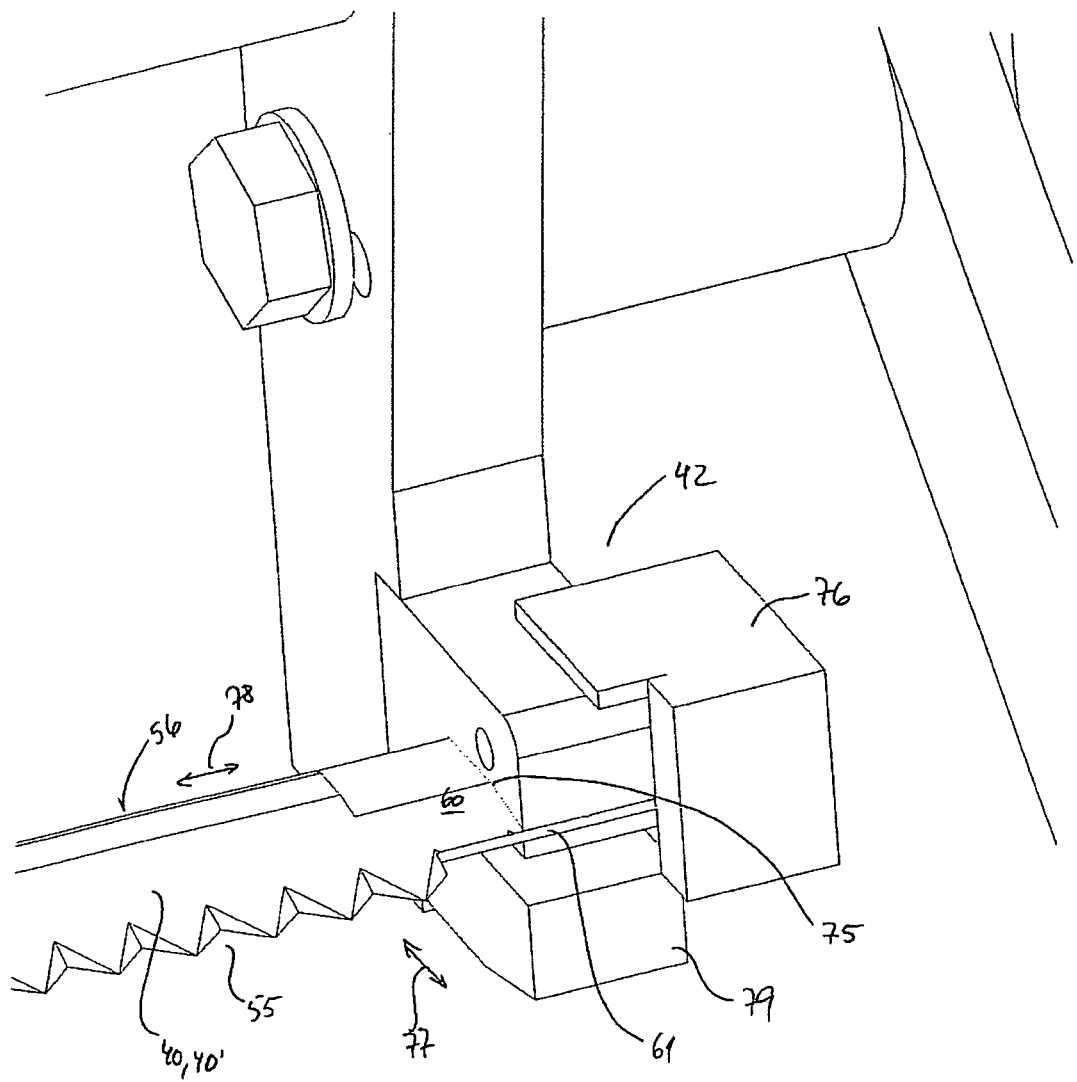
FIG. 9 illustrated what the knife holder opposite the end with the engagement member.

In the opposite end a knife-holder 42 is illustrated in FIG. 9. The knife-holder 42 has a slit 75 into which a second end 60 of the knife's blade is inserted. A further holding cap 76 is provided such that the knife may not be withdrawn in the direction of the arrow 77. The reciprocating action of the knives is carried in the direction indicated by the arrow 78. By first releasing the first end 57, i.e. loosening the screw 72, whereby the distance between the member 69, 70 is increased such that the engagement member 58 may be withdrawn from the cavity, it is possible to pull the second end 60 out of the holder 42 in the direction indicated by the left part of the arrow 78.

The member 76 as well as the engagement part 79 of the holder may advantageously be made in a plastic material such as for example Delarin® or other corresponding materials and is advantageously made such that it is easy to replace should wear occur due to the reciprocating movement of the knifes 40, 40'.

Above the inventive knives have been explained with reference to a particular embodiment where they are mounted in a fish slicing machine of a particular type, but it should be noted that the holders 41, 42 illustrated in FIGS. 8 and 9 may be provided in a host of other slicing machines whereby the inventive set of knives may be implemented in a large variety of cutting machines. Therefore the scope of protection for the present invention should not be limited to the detailed examples and embodiments explained above, but should solely be limited by the appended claims.

The invention claimed is:

1. Knife arrangement for use in a slicer apparatus for slicing meat, wherein the knife arrangement comprises two reciprocating knives (40, 40'), each knife (40, 40') has a blade (54) with a sharp edge (55) and an opposite edge (56), and blade material between said edges, where adjacent a first end (57) of each knife (40, 40') an engagement member (58) is arranged, the engagement member (58) being an integral part of the blade and extending from a side of the blade perpendicular to a plane extending between the sharp edge and the opposite edge of the blade (40, 40'), and wherein the engagement members are arranged in the ends of the knives, wherein the blades (54) of the two knives (40, 40') are arranged adjacent each other, with their sharp edges (55) oriented in the same direction, and where the engagement member (58) on either blade (54) protrudes in opposite directions relative to the blade's plane, but substantially parallel to a common axis (59);

wherein the knife arrangement further comprises first and second knife holders (41, 42), wherein:

the first knife holder (41) comprises connection means (65, 66, 67), and where on mutually facing surfaces between a first member (69) and a second member (70) a cavity is provided, said cavity having a minimum cross section less than the cross section of the engagement member, and fastening means (72), for forcing the first and second members together to clamp the engagement members of the first and second knives; and the second knife holder (42) comprises a slit (75) arranged in a body (79) of said knife holder (42), and knife retaining means (76), arranged on said body (79).

2. Knife apparatus comprising:

a first knife and a second knife, the first knife and the second knife reciprocating with respect to each other for slicing material, the first knife having first and second opposite ends, first and second opposite edges between the first and second opposite ends, and first and second opposite sides, one of the first and second opposite edges having a first sharp blade edge and another of the first and second opposite edges having a first dull edge, a first integral engagement device on one of the first and second opposite ends on the first side of the first knife, a first knife guide on another of the first and second opposite ends, the second knife having third and fourth opposite ends, third and fourth opposite edges between the third and fourth opposite ends, and third and fourth sides, one of the third and fourth opposite edges having a second sharp blade edge and another of the third and fourth opposite edges having a second dull edge, a second integral engagement device on one of the third and fourth opposite ends on the fourth side of the second knife, a second knife guide on another of the third and fourth opposite ends, the second side of the first knife and the third side of the second knife being adjacent to each other, the first integral engagement device extending on the first side of the first knife and the second integral engagement device extending on the fourth side of the second knife, the first integral engagement device and the second integral engagement device extending in opposite directions respectively from the first knife and the second knife substantially parallel to a common axis and extending substantially perpendicular to a vertical plane between the first and second edges of the first knife and the third and fourth edges of the second knife, and extending substantially perpendicular to a longitudinal axis of reciprocating movement of the first knife and the second knife, and the first sharp blade edge of the first knife and the second sharp blade edge of the second knife operatively slicing along a same cutting line.

3. The apparatus of claim 2, wherein the first blade edge of the first knife and the second blade edge of the second knife are adjacent each other with respective sharp edges oriented in a same direction.

4. The apparatus of claim 2, wherein the first knife guide comprises a flat unsharpened profile on both of the first and second opposite edges, and the second knife guide comprises a flat unsharpened profile on both of the third and fourth opposite edges.

5. The apparatus of claim 2, further comprising a first set of cavities on the first side of the first knife between the first and the second opposite edges.

6. The apparatus of claim 5, wherein each of the first set of cavities has an oblong profile with a longitudinal axis of each cavity being perpendicular to the first and second edges of the first knife.

7. The apparatus of claim 5, further comprising a second set of cavities on the fourth side of the second knife between the third and fourth opposite edges.

8. The apparatus of claim 7, wherein each of the second set of cavities has an oblong profile with a longitudinal axis of each cavity being perpendicular to the second and third edges of the second knife.

9. The apparatus of claim 2, wherein the first sharp blade edge and the second sharp blade edge have sharp edge shapes selected from the group consisting of wave or zig-zag shapes.

* * * * *